Aug. 19, 1941.　　K. MANDELBAUM　　2,252,975

DIRECTIONAL SIGNAL

Filed June 3, 1939

INVENTOR
Kermit Mandelbaum
BY
ATTORNEY

Patented Aug. 19, 1941

2,252,975

UNITED STATES PATENT OFFICE 2,252,975

DIRECTIONAL SIGNAL

Kermit Mandelbaum, New York, N. Y.

Application June 3, 1939, Serial No. 277,127

2 Claims. (Cl. 200—59)

This invention relates to new and useful improvements in a directional signal.

The invention has for an object the construction of a directional signal which is characterized by a body of any design for attachment on, in, or upon a vehicle, a signal supported upon said body, and an arrangement for extending the signal and illuminating same when desired.

More specifically, the invention proposes two identical directional signals arranged in opposite directions to individually signal a turn to the right or to the left.

Another object of this invention resides in the use of a solenoid in each signal for assisting in extending the signal.

Still further the invention contemplates the use of an electric lamp within the signal for the illumination thereof.

Another object of this invention resides in the provision of a switch of any design and construction, preferably, which may be momentarily closed, and a circuit used in conjunction with the switch provided with a holding relay for maintaining the circuit in a closed position until a turn of the vehicle actuates the directional signal.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
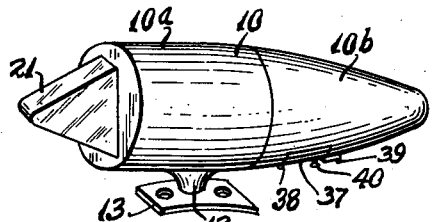
Fig. 1 is a perspective view of a directional signal constructed according to this invention and extended to the left.
Figure 2:
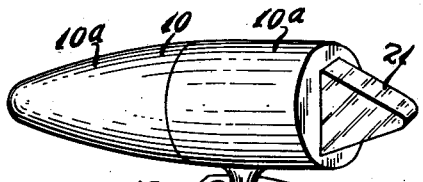
Fig. 2 is an identical signal extended to the right.
Figure 3:
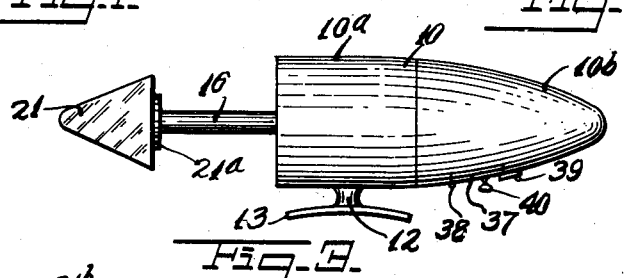
Fig. 3 is a side elevational view of one of the directional signals illustrated with the signal element thereof extended.

The directional signal, in accordance with this invention includes a body 10 of any design and construction for attachment on or in, or upon a vehicle. The body 10 is of hollow construction and formed of a front section 10ª and a rear section 10ᵇ releasably connected together, preferably by a threaded joint 11 at the adjacent end portions thereof. One of these sections is provided with a tubular extension 12 having a flange 13 for engagement upon an automobile fender or other portion of an automobile body by which the signal may be attached in position.

A solenoid 14 is supported within the body, preferably by a bracket 15. This solenoid has a core consisting of a front section 16 and a rear section 17. The front section 16 is of non-magnetic material such as brass, wood, etc., and of any design and construction, for example of tubular form. The rear section 17 is of magnetic metal such as iron. The front and rear sections 16 and 17 are rigidly connected together in any manner. A means is provided for retracting the core. This means includes an expansion spring 18 coaxially mounted on the rear portion 17 of the core and acting between a washer 19 engaging one end of the core, and a clip 20 attached upon the rear end of the section 17. The arrangement is such that the spring 18 normally extends the core inwards, or other means may be provided for normally moving the core inwards. When the solenoid is energized the iron core 17 will be attracted and move forwards compressing the spring 18.

A signal 21 is mounted upon the front end of the core section 16. This signal is of arrow shape or any other suitable shape for signalling purposes and constructed of translucent or transparent material such as colored glass or frosted glass, or other similar materials. A signal lamp 22 is disposed within the signal 21 and is mounted in an electric socket 23 mounted on the extended end at the core section 16. The signal 21 has a flange portion 24 which is threadedly engaged on a cylindrical member 25 attached upon the core section 16. With this arrangement the signal 21 may be screwed off when desired to give access to the lamp 22 which may be changed when required. The signal may be attached to the core in other ways, if so desired. A rubber washer 21ª is mounted on the rear end of the signal 21 for striking the front end of the body 10 and cushioning the blow when the signal 21 is retracted. Another rubber washer 21ᵇ is mounted in the body 10 to line the opening 10ᶜ through which the core 16 extends. This rubber washer 21ᵇ prevents water from entering within the body 10 and also acts as a wiper for the sliding core 16.

The lamp socket 23 is connected with a cable 26 which extends through the tubular section 16 and at the point 27 extends through an opening in the tubular section to the exterior thereof. The cable 26 continues into a coil portion 26ª and a lead 26ᵇ which extends through the tube 12 and is wired as hereinafter more fully explained.

Figure 4:
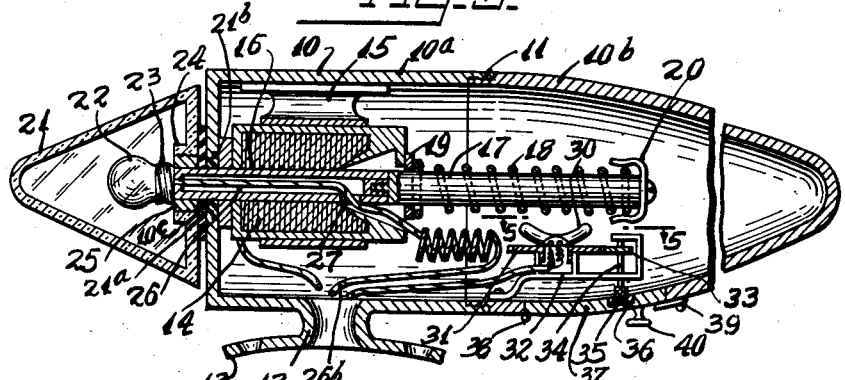
Fig. 4 is a transverse sectional view of the directional signal with the signal element thereof retracted.
Figure 5:
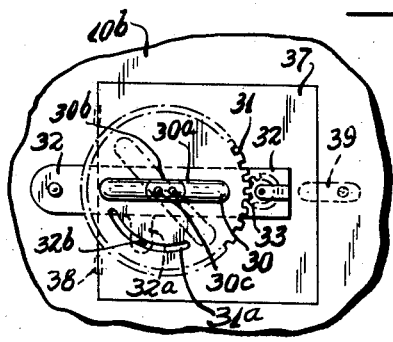
Fig. 5 is a fragmentary horizontal sectional view taken on the line 5—5 of Fig. 4.

Within the body 10 there is mercury switch 30. This switch is fixedly mounted on a gear 31 diametrically of the gear. The mercury switch 30 comprises a glass or other suitable casing 30ᵃ of arcuate shape, as shown in Fig. 4 and contains a small quantity of mercury 30ᵇ which in one position is adapted to close the circuit through a pair of contacts 30ᶜ. The gear 31 is turnably supported on a bracket 32. A pin 32ᵇ is inserted on a projection 32ᵃ from the bracket 32 and engages into an arcuate slot 31ᵃ concentric on the gear 31 to limit turning thereof.

Figure 6:
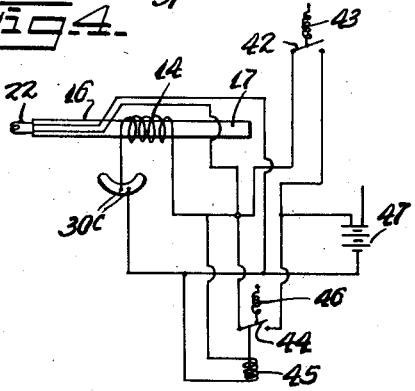
Fig. 6 is a schematic wiring diagram of the device.

A pinion 33 meshes with the gear 31 and is also rotatively supported upon this bracket 32. The pinion 33 is mounted on a stem 34 provided with a head 35 by which it may be turned. This head 35 normally is engaged by a piece of rubber material 36 mounted on a door 37 mounted in one side of the casing 10. This door 37 is supported by a hinge 38 at one side and a releasably latch 39 at the other side. A handle 40 is provided by which the door may be opened. The contacts 30ᶜ are connected in a circuit as illustrated in Fig. 6.

In addition to the mechanism shown in Figs. 1 to 5, each directional signal is provided with a switch 42 mounted on the dashboard of the vehicle or other convenient place where the driver may operate the same. Each switch 42 has a spring 43 to urge it into an open position. The switch may be manually closed and as soon as released will automatically open. In addition each directional signal is provided with a holding relay comprising a switch portion 44 and a coil portion 45. The switch portion 44 is urged into an open position by a spring 46. The coil portion 45 is adapted to hold the switch 44 closed. The battery of the vehicle or some other source of power 47 is provided to operate the directional signal.

The solenoid 14 is connected in series with the switch 42, the battery 47 and the mercury switch 30. The lamp 22 is shunted across the solenoid 14 and the mercury switch 30. The relay 45 is also shunted across the solenoid 14 and the mercury switch 30.

The operation of the device is as follows:

To sign a turn the operator momentarily closes the switch 42. This instantly lights the lamp 22, energizes the solenoid 14 and the relay 45, the switch portion 44 of which then closes holding the circuit closed through the solenoid 14 and the mercury switch 30 even though the switch 42 is immediately released. The solenoid 14 functions to extend the signal 21 and the lamp 22 is energized to illuminate the signal. The parts remain in this condition until the turn is started or until the turn has sufficiently progressed to cause centrifugal force to move the mercury 30ᵇ of the mercury switch 30 to disconnect the contacts 30ᶜ. This breaks the circuit through the relay 45 and the spring 46 opens the switch 44. The core of the solenoid 14 is immediately retracted by the spring 18 and the lamp 22 is simultaneously extinguished because the circuit through it has been broken.

It is possible to open the door 37 and properly turn the handle 34 to a position in which the mercury switch is in an oblique direction. Suitable adjustment may be made to have the mercury switch break the circuit immediately at the start of the turn or during some other portion of the turn. The mercury switch may be adjusted to adapt the device to the driving characteristics of an individual driver or group of drivers so that the device will function properly. The adjustment to the mercury switch 30 is provided for controlling the sensitivity of its operation. When the mercury switch 30 is turned to a position parallel to the length of the car it will be least sensitive, and when turned to a position at right angles to the length of the car it will be most sensitive. By the same token, positions between these two extremities will produce varying degrees of sensitivity.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described, a hollow casing mounted on a horizontally movable member and having a bottom opening closed by means of a pivotally mounted door, a bracket mounted within said casing, a gear rotatively supported on a vertical axis on said bracket and having a horizontal top face, a substantially U-shaped tube mounted on the top face of said gear and having electrical contacts mounted therein, a mass of electrically conductive material freely movable in said tube to shift relative to said contacts to control a circuit through said contacts as said member moves horizontally, a shaft vertically rotatively mounted in said casing, a pinion mounted on the upper end of said shaft and meshing with said gear to rotate said gear as said shaft is turned to shift the angular position of said tube, a knob mounted on the lower end of said shaft in the vicinity of said door to facilitate the rotation of said shaft in the open position of said door, and frictional means on the inside face of said door bearing against said knob to hold said shaft against turning in the closed position of said door.

2. In a device of the class described, a hollow casing mounted on a horizontally movable member and having a bottom opening closed by means of a pivotally mounted door, a bracket mounted within said casing, a gear rotatively supported on a vertical axis on said bracket and having a horizontal top face, a substantially U-shaped tube mounted on the top face of said gear and having electrical contacts mounted therein, a mass of electrically conductive material freely movable in said tube to shift relative to said contacts to control a circuit through said contacts as said member moves horizontally, a shaft vertically rotatively mounted in said casing, a pinion mounted on the upper end of said shaft and meshing with said gear to rotate said gear as said shaft is turned to shift the angular position of said tube, a knob mounted on the lower end of said shaft in the vicinity of said door to facilitate the rotation of said shaft in the open position of said door, and frictional means on the inside face of said door bearing against said knob to hold said shaft against turning in the closed position of said door, comprising a piece of rubber mounted on the inside face of said door and bearing against said knob.

KERMIT MANDELBAUM.